United States Patent
Hirayama et al.

(10) Patent No.: US 6,882,326 B2
(45) Date of Patent: Apr. 19, 2005

(54) PORTABLE INFORMATION TERMINAL

(75) Inventors: Naofumi Hirayama, Tokyo (JP); Daisuke Suma, Tokyo (JP); Mizuki Tomono, Tokyo (JP); Tatsufumi Funayama, Tokyo (JP)

(73) Assignees: Pioneer Corporation, Tokyo (JP); Pioneer Design Corporation, Tokyo (JP)

( * ) Notice: Subject to any disclaimer, the term of this patent is extended or adjusted under 35 U.S.C. 154(b) by 420 days.

(21) Appl. No.: 10/167,611

(22) Filed: Jun. 13, 2002

(65) Prior Publication Data
US 2002/0196228 A1 Dec. 26, 2002

(30) Foreign Application Priority Data

Jun. 22, 2001 (JP) ........................................ 2001-189912

(51) Int. Cl.[7] ............................. G09G 5/00; H04M 1/56; H04M 1/00
(52) U.S. Cl. ........................... 345/1.1; 345/2.2; 345/156; 345/169; 379/142.15; 379/355.03
(58) Field of Search ...................... 345/1.1, 1.3, 2.1–2.3, 345/156, 169; 379/110.01, 142.15, 355.03

(56) References Cited

U.S. PATENT DOCUMENTS

| | | | | |
|---|---|---|---|---|
| 5,189,632 A | * | 2/1993 | Paajanen et al. | 708/109 |
| 5,550,754 A | * | 8/1996 | McNelley et al. | 348/14.01 |
| 5,797,089 A | * | 8/1998 | Nguyen | 455/403 |
| 5,893,037 A | * | 4/1999 | Reele et al. | 455/556.1 |
| 6,049,450 A | * | 4/2000 | Cho et al. | 361/683 |
| 6,144,358 A | * | 11/2000 | Narayanaswamy et al. | 345/102 |
| 6,259,932 B1 | * | 7/2001 | Constien | 455/556.1 |
| 6,567,677 B1 | * | 5/2003 | Sokoloff | 379/433.02 |
| 6,646,672 B1 | * | 11/2003 | Feierbach | 348/14.02 |
| 6,748,243 B1 | * | 6/2004 | Kubo et al. | 455/569.1 |
| 6,757,551 B1 | * | 6/2004 | Newman et al. | 455/556.1 |
| 6,779,185 B1 | * | 8/2004 | Roukbi et al. | 719/321 |

* cited by examiner

Primary Examiner—Regina Liang
Assistant Examiner—Duc Dinh
(74) Attorney, Agent, or Firm—Arent Fox

(57) ABSTRACT

A portable information terminal 1 includes a primary terminal 2 and a secondary terminal 3 which are combinable and separable from each other, and individually have displays 2A, 3Ba, operation keys 2B, 3Aa, RAMs 24, 36, antennas 26, 37, and CPUs 20, 30. The RAMs 24, 36 of the respective terminals 1, 2 store application programs and the CPUs 20, 30 individually control to operate a required function and display an image on the displays 2A, 3Ba. The CPUs 20, 30 are connected through communication between the antennas 26, 37 to systematically share an operation for a required function and to display images associated with each other on the respective displays 2A and 3Ba.

15 Claims, 12 Drawing Sheets

PORTABLE INFORMATION TERMINAL

BACKGROUND OF THE INVENTION

1. Field of the Invention

This invention relates to an information terminal which is capable of being installed with functions distributed for carrying.

The present application claims priority from Japanese Application No. 2001-189912, the disclosure of which is incorporated herein by reference for all purposes.

2. Description of the Related Art

In recent years, various types of portable information terminals such as a notebook-type personal computer, a PDA, a portable telephone and the like have become rapidly and widely available. Along with this, a variety of functions installed on portable information terminals for information processing have become rapidly enhanced.

However, with the explosive progression of information technology, a disparity between persons in the degree of successful usage of the information terminals has widened, which has raised the serious problem associated with the so-called "digital divide" in which persons unskilled in handling the information terminals are falling behind in society in terms of jobs, income and the like.

In the future, with the diversification of the needs of society, a portable information terminal alone must be increasingly required to meet the miscellaneous needs, e.g., communication, transmission and collection of information, accumulation and editing of information, electronic commerce, and controls for other devices. For this requirement, a multifunction design for portable information terminals will need to be further progressed to increase the number of available functions, and in consequence the manipulation thereof will be further complicated, which must make the problem of the "digital divide" even more significantly serious.

In addition, such progress in multifunction design will enable a single portable information terminal to accumulate various kinds of information including personal information, which produces another serious problem of how to ensure security when a high volume of information accumulated is carried around.

SUMMARY OF THE INVENTION

The present invention has been made to solve the problems associated with progress in multifunction design to increase the number of available functions in portable information terminals as described above.

It is therefore an object of the present invention to provide a portable information terminal capable of solving the problem of the "digital divide" deepening with the progress in multifunction design, and of enhancing security when a high volume of information accumulated is carried around.

To attain the above object, according to a first feature of the present invention, there is provided a portable information terminal comprising a primary terminal and a secondary terminal which are separably combined with each other. The primary and secondary terminals each have a display, a manipulation element, a memory section for storing application programs, a communication element, and a control section for controlling the display, manipulation element, memory section and communication element. The control section of each of the primary and secondary terminals independently performs a control operation under an activated application program stored in the memory section thereof to operate a required function and allow the display to display an image in accordance with the manipulation of the manipulation element thereof. Through communication between the communication elements of the primary terminal and the secondary terminal, the control sections of the primary and secondary terminals are connected to each other for a systematic link between the respective manipulation elements in terms of manipulation, to perform a linked operation for a required function and allow the respective displays to display mutually associated images in accordance with the manipulation of the respective manipulation elements under the application program stored in one or both of the memory sections of the primary and secondary terminals.

In the first feature, the portable information terminal comprises the primary and secondary terminals each of which is capable of independently executing a required function, and also which are capable of executing a required function in coordination with each other when they are combined.

Specifically, the primary terminal and the secondary terminal each include the display for displaying a video image or an image for data processing, the control section for operating the display to display an image or the like and performing the operation necessary for data processing, the manipulation element for inputting manipulation into the control section, and the memory section for storing application programs for executing a variety of functions and various kinds of data. In each of the primary and secondary terminals when they are separated from each other, the control section performs the operational control in accordance with the manipulation inputted in the manipulation element to activate the application program stored in the memory section, and thus the primary or secondary terminal can execute the necessary functions independently.

The primary and secondary terminals each include the communication element capable of performing data communication between the primary and secondary terminals. Therefore, in either case, when the primary and secondary terminals are combined or separated, the data communication between both communication elements allows both the control sections to connect to each other for a systematic link. The systematic link between the control sections allows a systematic link between both of the manipulation elements.

In the situation when the control sections of the primary and secondary terminals are connected through the respective communication elements, when the application program stored in one or both of the memory sections is activated, the linked primary and secondary terminals perform the required function operation in accordance with the linked manipulation input of both the manipulation elements. Further, for example, in the case of the combination of the main and secondary terminals, the displays of the main and secondary terminals form a double window, which allows one of the displays to be used as a main display screen and the other to be used as an auxiliary display screen for displaying an icon bar, a toolbar and the like. With such a usage pattern, the main and secondary terminals can fully perform all of their functions.

In the case of the first feature, therefore, the primary and secondary terminals which can either be combined or separated from each other each have the ability to execute functions independently. Hence, each of the primary terminal and the secondary terminal can be assigned independently executable functions, so that it is possible to simplify the manipulation for executing each of the functions, resulting in avoidance of the "digital divide" problem associated with the progress in multifunction design for information terminals.

Further, the portable information terminal of the present invention is designed to establish communication between the primary and secondary terminals to allow the primary and secondary terminals to be systematically linked for execution of a single function as required. With this design, the portable information terminal can fully function as a mobile computer.

Still further, in the portable information terminal, various kinds of data can be distributed for storage in the primary and secondary terminals. Hence, the degree of risk when the information terminal is carried around is decreased, resulting in the enhancement of security on data stored in the portable information terminal.

To attain the aforementioned object, according to a second feature of the present invention, in addition to the configuration of the first feature, the primary terminal further includes a secondary-terminal mounting base for attaching the secondary terminal for combination, and a combination detection member provided, in the secondary-terminal mounting base, for detecting attachment of the secondary terminal and then connecting the control section of the primary terminal to the control section of the secondary terminal.

With the portable information terminal according to the second feature, the secondary terminal is attached to the secondary-terminal mounting base provided in the primary terminal for combination with the primary terminal. When this takes place, the attachment of the secondary terminal to the primary terminal is detected by the combination detection member installed in the mounting base, and then the control section of the primary terminal is automatically connected systematically to the control section of the secondary terminal.

To attain the aforementioned object, according to a third feature of the invention, in addition to the configuration of the first feature, the primary terminal further includes an interface for mounting an external storage medium.

With the portable information terminal according to the third feature, for example, if an external storage medium such as a memory card or the like storing a variety of application programs is loaded in the interface as required, it becomes possible to selectively set or add a required function or change the functions. If video software is loaded, the user can enjoy watching a film. Further, with the addition of a memory card, a storage capacity for accumulating data can be easily increased, for example.

To attain the aforementioned object, according to a fourth feature of the invention, in addition to the configuration of the third feature, the interface of the primary terminal of the primary terminal is a DVD drive.

With the portable information terminal according to the fourth feature, if video software is loaded in the DVD drive, the primary terminal can serve as a DVD player. If a DVD storage medium storing various application programs, data or the like is loaded in the DVD drive, then it becomes possible to set or add a required function, change functions, increase a storage capacity, or the like.

To attain the aforementioned object, according to a fifth feature of the invention, in addition to the configuration of the third feature, the interface of the primary terminal is a memory-card interface.

With the portable information terminal according to the fifth feature, when the memory-card interface is loaded with a memory card such as a Smartmedia, compact flash, memory stick, multimedia card or the like, it is very easy to set or add a required function or change functions of the primary terminal or increase the storage capacity, for example.

To attain the aforementioned object, according to a sixth feature of the invention, in addition to the configuration of the first feature, the display of the primary terminal has a display screen area larger than that of the display of the secondary terminal.

With the portable information terminal according to the sixth feature, for example, if the secondary terminal is designed according to portable telephone specifications, and has a relatively small sized display, various kinds of data stored in the secondary terminal can be edited on the larger display of the primary terminal. Further, thanks to the larger display of the primary terminal, the secondary terminal can fully function as a mobile computer.

To attain the aforementioned object, according to a seventh feature of the invention, in addition to the configuration of the first feature, the communication element of the primary terminal performs Bluetooth communication to communicate with the communication element of the secondary terminal.

With the portable information terminal of the seventh feature, since the communication between the primary and secondary terminals is based on the Bluetooth technology, it is possible to enhance security by means of authentication and encryption processing which are required in the Bluetooth technology.

To attain the aforementioned object, according to an eighth feature of the invention, in addition to the configuration of the first feature, the secondary terminal further includes an interface for mounting an external storage medium.

With the portable information terminal of the eighth feature, for example, if an external storage medium such as a memory card storing a variety of application programs is loaded in the interface as required, it becomes possible to selectively set or add a required function or change functions. Further, with the addition of a memory card, a storage capacity for accumulating data can be easily increased, for example.

To attain the aforementioned object, according to a ninth feature of the invention, in addition to the configuration of the eighth feature, the interface of the secondary terminal is a memory-card interface.

With the portable information terminal of the ninth feature, when the memory-card interface is loaded with a memory card such as a SmartMedia, compact flash, memory stick or multimedia card, it is very easy to set or add a required function or change functions of the primary terminal and increase the storage capacity, for example.

To attain the aforementioned object, according to a tenth feature of the invention, in addition to the configuration of the first feature, the secondary terminal further includes a digital photographing member.

With the portable information terminal of the tenth feature, the secondary terminal can be used as a digital camera by operating the digital photographing member. Further, with the combination of the secondary terminal with the primary terminal, the display of the primary terminal can show an image photographed by the digital photographing member, to provide for simplified editing of the image.

To attain the aforementioned object, according to an eleventh feature of the invention, in addition to the configuration of the first feature, the manipulation element of the secondary terminal includes a key-button member, a jog dial member and a joystick member.

With the portable information terminal of the eleventh feature, the secondary terminal is operated through manipulation of the key-button member, jog dial member and joystick member which form the manipulation element. And also, when the secondary terminal is combined with the primary terminal, the manipulation members can be systematically linked to the manipulation element of the primary terminal in terms of the manipulation input. This design allow the portable information terminal to fully function as a mobile computer.

To attain the aforementioned object, according to a twelfth feature of the invention, in addition to the configuration of the first feature, the display of the secondary terminal is fitted movably in relation to a portion of the secondary terminal attached to the primary terminal, to be set in a position selected from a plurality of selectable positional patterns with respect to the display of the primary terminal when the secondary terminal is combined with the primary terminal.

With the portable information terminal of the twelfth feature, when the display of the secondary terminal is moved in relation to the portion in which the manipulation element of the secondary terminal is located, and the secondary terminal is combined with the primary terminal, the display of the secondary terminal is set in a desired position with respect to the display of the primary terminal. For example, the display of the secondary terminal is placed in parallel with and along a top edge of the display of the primary terminal. Such selecting of the positioning further improves the effect of image display in the double window constructed by the displays of the secondary and primary terminals.

To attain the aforementioned object, according to a thirteenth feature of the invention, in addition to the configuration of the twelfth feature, the secondary terminal further includes a positional detection member for detecting positions of the display of the secondary terminal, and the control section of the secondary terminal is switched into a predetermined functional mode corresponding to the position of the display detected by the positional detection member.

With the portable information terminal of the thirteenth feature, when the display of the secondary terminal is moved in relation to the portion in which the manipulation element of the secondary terminal is located, and is positioned in a selected position, the positional detection member detects the position of the display, and a functional mode in the control section is automatically switched into mode corresponding to the detected position of the display.

Such simple and automatic switching between the modes enables the user to operate the portable information terminal with ease, leading to a solution of the "digital divide" problem.

To attain the aforementioned object, according to a fourteenth feature of the invention, in addition to the configuration of the first feature, the communication element of the secondary terminal performs Bluetooth communication with the communication element of the primary terminal, and communication with a mobile communication network.

With the portable information terminal of the fourteenth feature, since the communication between the primary and secondary terminals is based on the Bluetooth technology, it is possible to enhance security by means of authentication and encryption processing which are required in the Bluetooth technology. The communication of the communication element with the mobile communication network allows the secondary terminal to serve as a portable telephone, and to be connected to a computer network through the mobile communication network to provide the user with various services on the Internet.

To attain the aforementioned object, according to a fifteenth feature of the invention, in addition to the configuration of the first feature, the secondary terminal includes a microphone and a speaker, and is installed with an application program for performing a telephone function for communication with a mobile communication network through the communication element of the secondary terminal.

With the portable information terminal of the fifteenth feature, a telephone call can be established through the mobile communication network by the application program for performing the telephone function using the microphone and the speaker.

These and other objects and features of the present invention will become more apparent from the following detailed description with reference to the accompanying drawings.

DETAILED DESCRIPTION OF THE PREFERRED EMBODIMENT

A preferred embodiment according to the present invention will be described hereinafter in detail with reference to the accompanying drawings.

Figure 1:
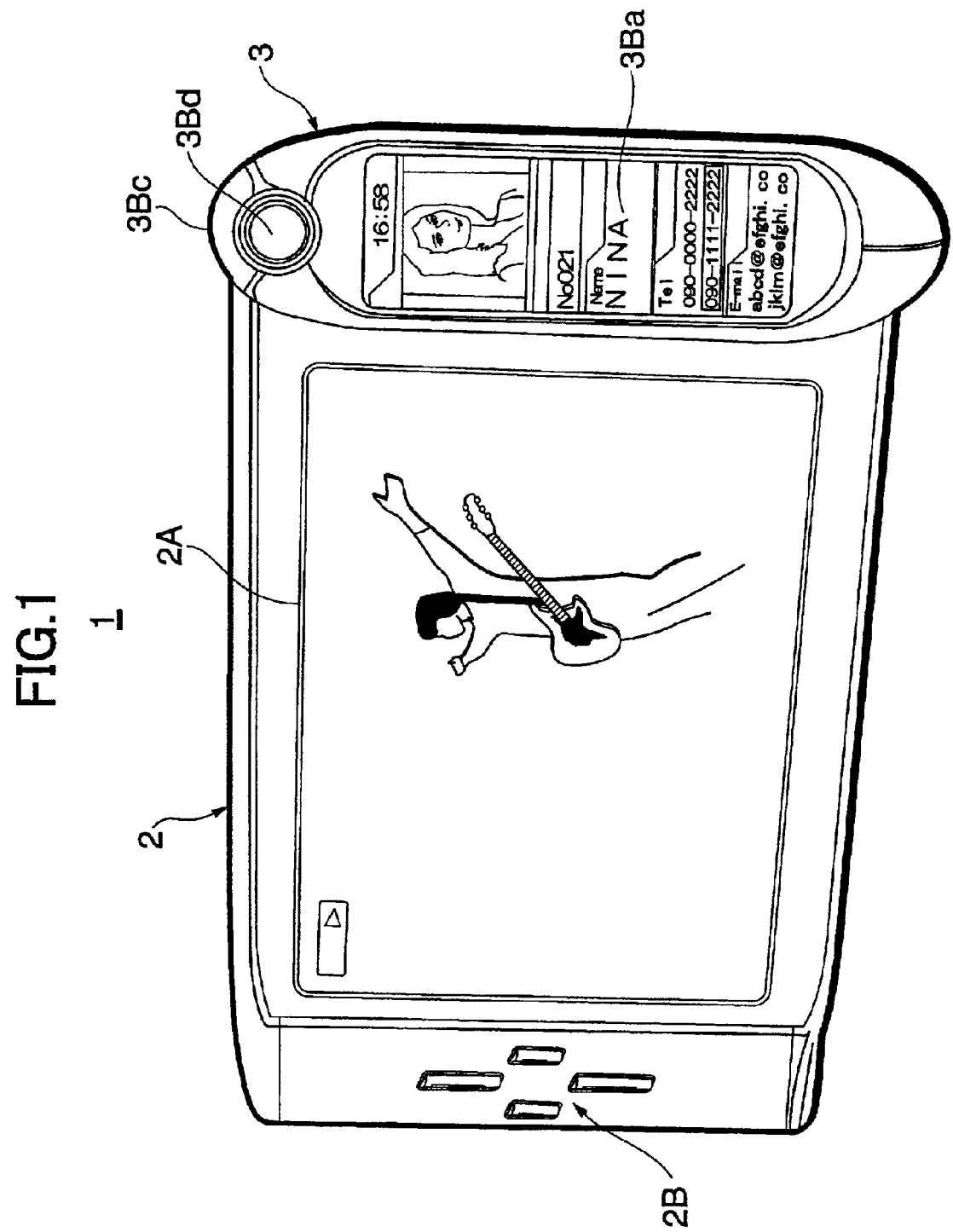
FIG. 1 is a perspective view illustrating an example of a portable information terminal according to a preferred embodiment of the present invention.
Figure 2:
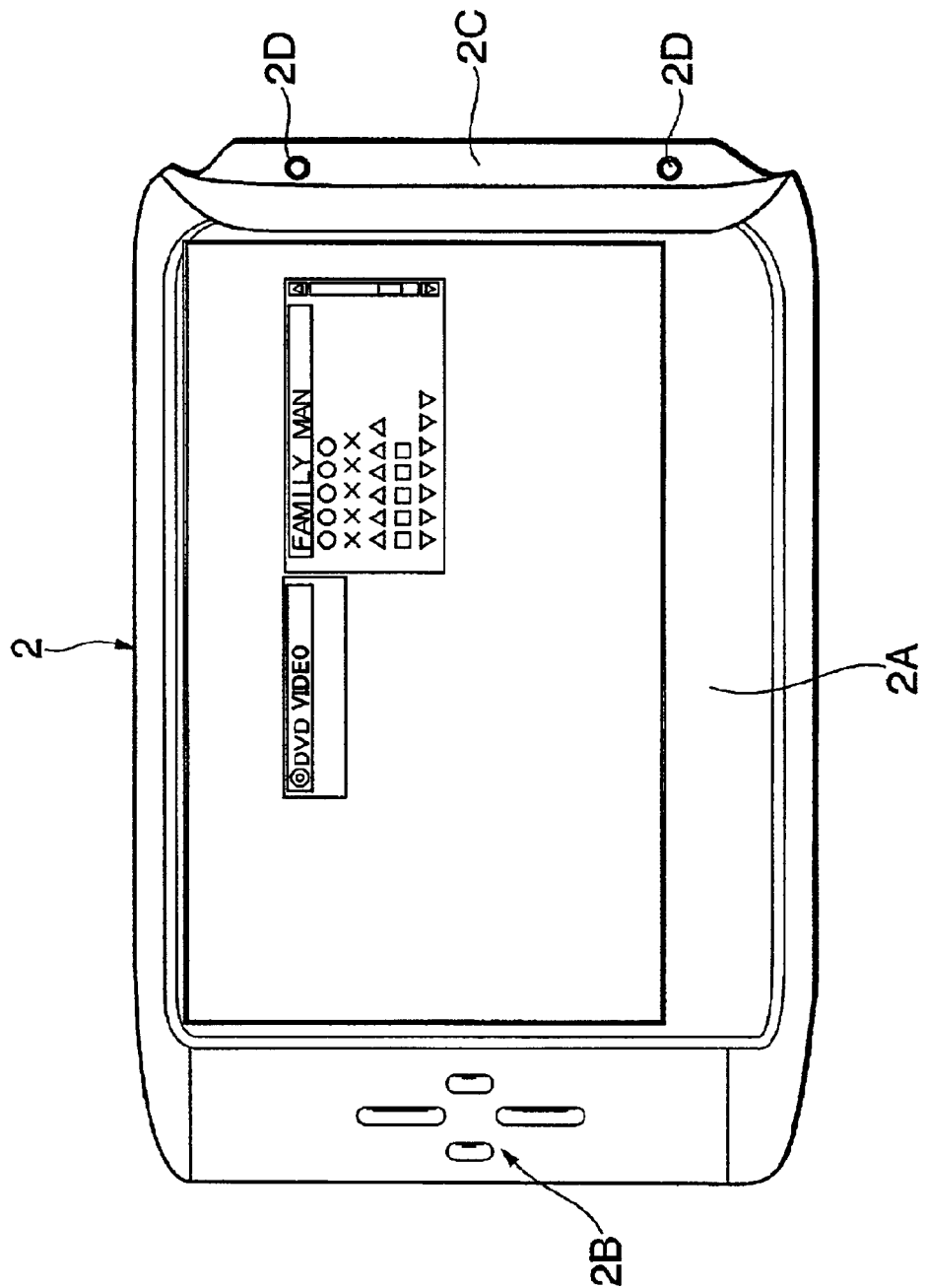
FIG. 2 is a front view illustrating a primary terminal of the portable information terminal in the example in FIG. 1.
Figure 3:
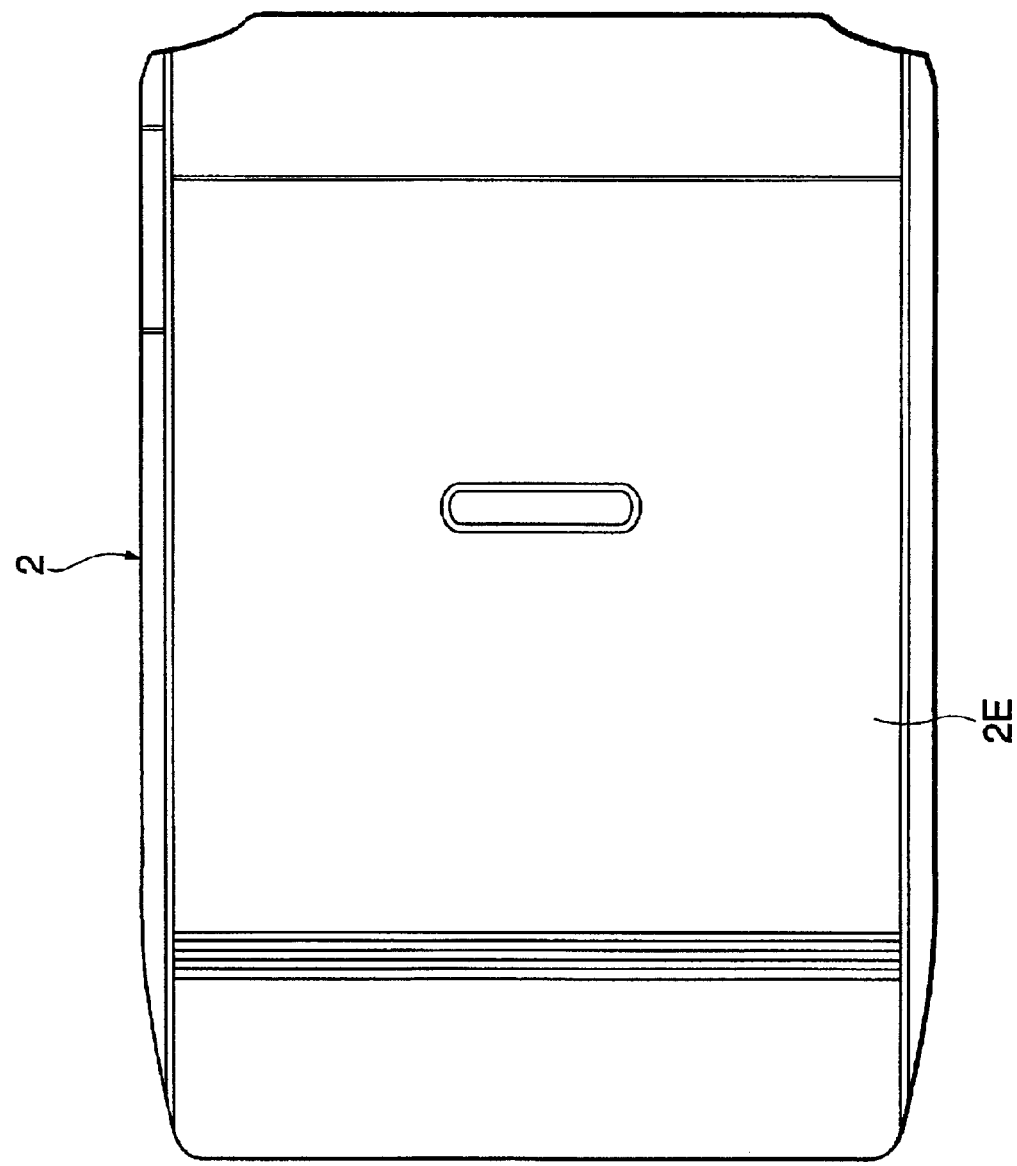
FIG. 3 is a rear view illustrating the primary terminal.
Figure 4:
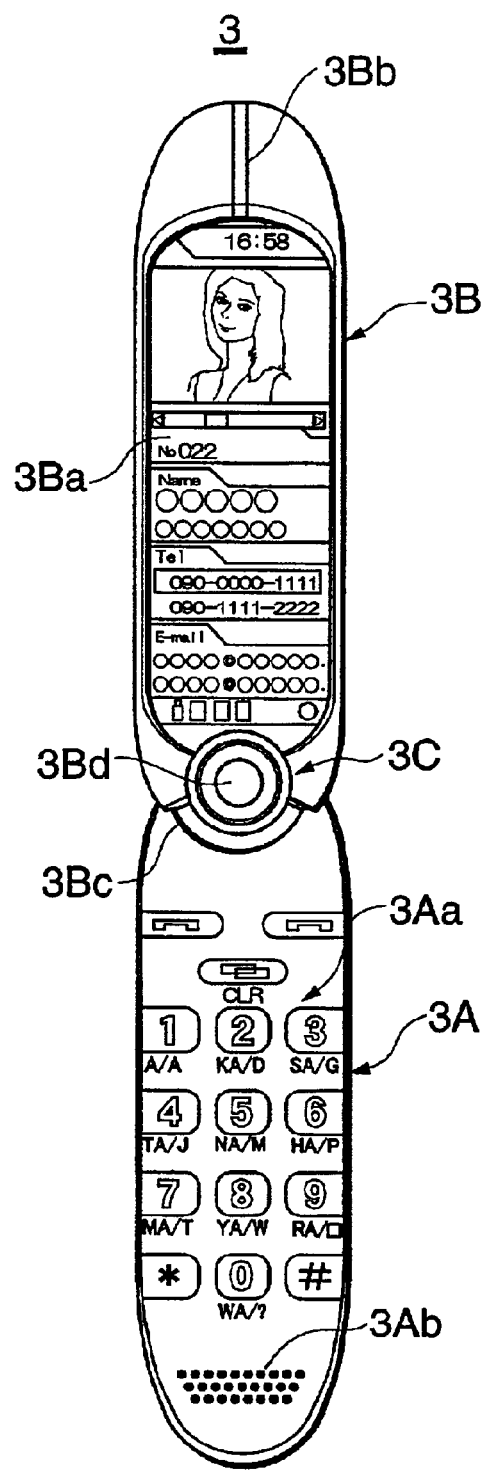
FIG. 4 is a front view illustrating a secondary terminal in an open position when a display section is opened in relation to a secondary operating section in accordance with the embodiment.
Figure 5:
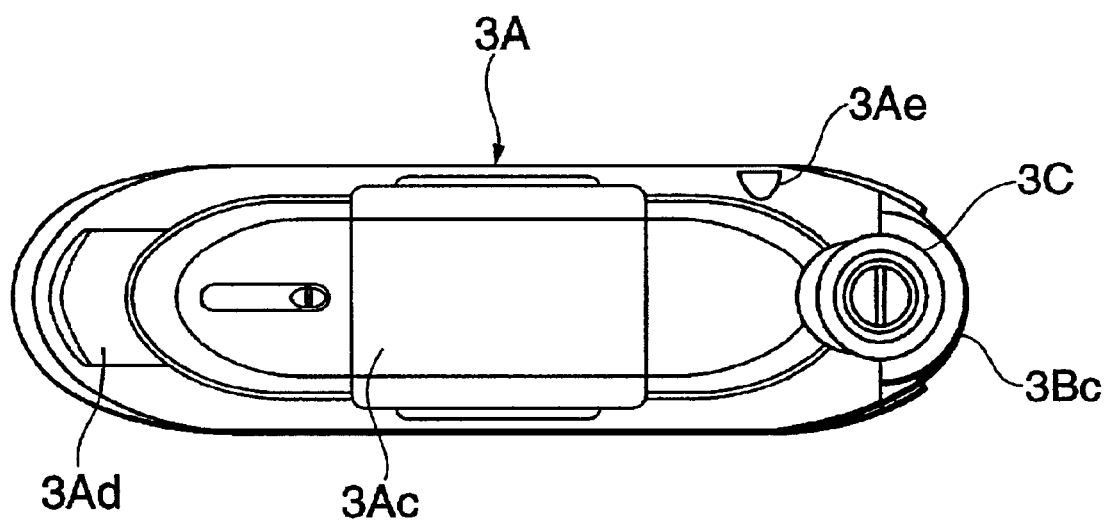
FIG. 5 is a rear view of the secondary terminal.

FIG. 1 is a perspective view illustrating an example of portable information terminal according to a preferred embodiment of the present invention. FIG. 2 is a front view illustrating a primary terminal forming part of the portable information terminal in FIG. 1. FIG. 3 is a rear view illustrating the primary terminal. FIG. 4 is a front view illustrating a secondary terminal forming part of the portable information terminal in one of its usage patterns. FIG. 5 is a rear view of the secondary terminal.

In FIG. 1, the portable information terminal 1 is constructed of two parts, a primary terminal 2 and a secondary terminal 3 separably combined with the primary terminal 2.

As illustrated in FIG. 2, the primary terminal 2 has a substantially quadrangular plate-shaped outside shape, on the front surface of which a display panel 2A having a size occupying most of a central area of the front surface is located, and four operation keys 2B are arranged on a frame situated on the left of the display panel 2A.

The primary terminal 2 has on the right edge thereof a mounting base 2C which is formed into a recess shape corresponding to a shape of the left edge of the secondary terminal 3 to fit with the secondary terminal 3 for combined use. The mounting base 2C incorporates a pair of combination detection sensors 2D for detecting that the secondary terminal 3 is attached in place.

As illustrated in FIG. 3, on the back of the primary terminal 2, a DVD drive 2E is mounted, together with a card interface, speaker, and headphone terminal which are not shown.

As illustrated in FIG. 4, the secondary terminal 3 includes an elongated and approximately oval plate-shaped secondary manipulation part 3A, and a plate-shaped display part 3B having approximately the same outside shape as that of the secondary manipulation part 3A. The display part 3B has a bottom end coupled rotatably to a top end of the secondary manipulation part 3A through a rotation supporting element 3C.

With this coupling, as described later, the display part 3B moves rotatively in relation to the secondary manipulation part 3A from a closed position in which the display part 3B and the secondary manipulation part 3A are superimposed on each other, to a first open position in which the part 3B is opened to form a substantially right angle with the part 3A, or a second open position in which the part 3B is opened an angle of 180 degrees from the part 3A.

The secondary manipulation part 3A of the secondary terminal 3 includes a variety of operation keys 3Aa with a ten-key pad required for the origination and reception of telephone calls which are arranged over the front surface thereof, and a microphone 3Ab in a lower portion of the front surface thereof (the portion opposite to the portion supported by the rotational supporting element 3C).

A card interface 3Ac is mounted in a central portion on the back of the secondary manipulation part 3A, as illustrated in FIG. 5. A CCD camera 3Ad is mounted in a lower portion of the back of the part 3A (the portion opposite to the portion supported by the rotational supporting element 3C) so as to slide between the position in which the camera 3Ad is housed in a casing of the secondary manipulation part 3A and the position in which the camera 3Ad is projected outward from the casing of the part 3A along the axis of the part 3A.

A headphone terminal 3Ae is also mounted on a left side of the back of the secondary manipulation part 3A when viewed from the back thereof.

The display part 3B of the secondary terminal 3 includes on the front thereof a display panel 3Ba having a size occupying most of a central portion of the part 3B, and a speaker 3Bb at a top end thereof.

The display part 3B further includes a jog dial 3Bc and a joystick 3Bd at the bottom end thereof (the portion supported by the rotational supporting element 3C). The jog dial 3Bc has an outer edge which protrudes and is visible from the bottom end of the display part 3B, and is placed concentrically with the rotational supporting element 3C and rotatably in both directions. The joystick 3Bd is provided on the same axis as that of the rotational supporting element 3C.

The rotational supporting element 3C of the secondary terminal 3 includes a rotational position detection sensor, described later, for detecting in which position of the aforementioned three positions, the closed position, first open position and second open position, the display part 3B is situated in relation to the secondary manipulation part 3A.

Figure 6:
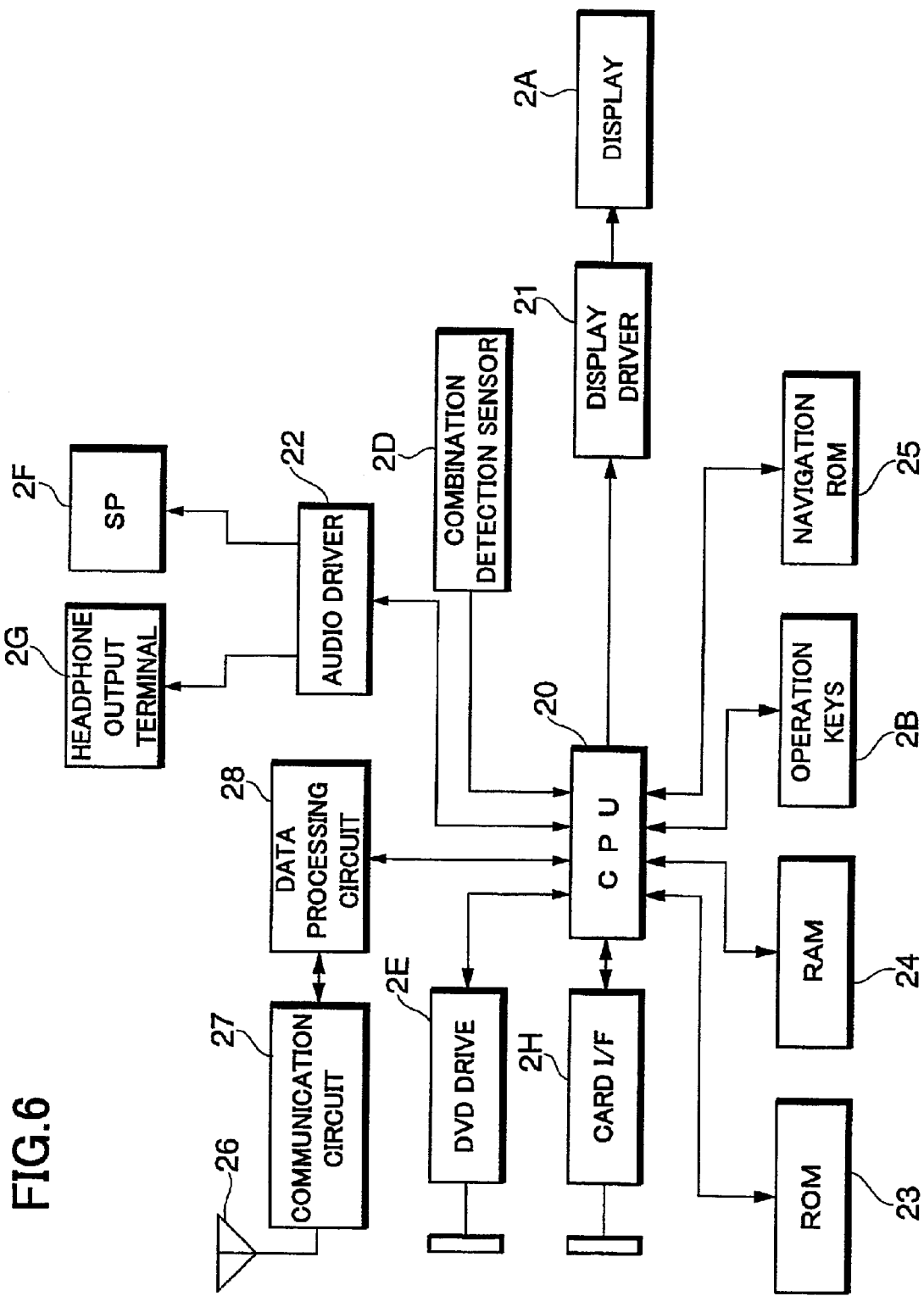
FIG. 6 is a block diagram illustrating the circuit configuration of the primary terminal in accordance with the embodiment.

FIG. 6 is a block diagram illustrating an example of the configuration of a control section incorporated in the primary terminal 2 of the portable information terminal 1.

Referring to FIG. 6, a CPU 20 is connected through a display driver 21 to the display panel 2A, and through an audio driver 22 to a speaker 2F and a headphone terminal 2G. The CPU 20 is further connected to: the combination detection sensors 2D; a DVD driver 2E for loading a DVD recording medium such as a DVD-R, DVD-RW, DVD-ROM or DVD-RAM (an 8-cm DVD-R or an 8-cm DVD-RW in the example); a card interface 2H for loading a memory card such as a SmartMedia, compact flash, memory stick or multimedia card; a ROM 23 for storing driver software programs for driving the devices connected to the CPU 20, and the like; a RAM 24 for storing data; the operation keys 2B; and a navigation ROM 25 for storing an application program for a navigation system.

The CPU 20 is further connected to an antenna 26, incorporated inside the casing of the primary terminal 2, through a data processing circuit 28 and a communication circuit 27. The data processing circuit 28 acts as a clock control for various signals transmitted from and received by the communication circuit 27, and serves as an interface of the CPU.

In the control section of the primary terminal 2 of the portable information terminal 1, the antenna 26 provides for communication, based on Bluetooth technology or the like, between the primary terminal 2 and the secondary terminal 3 for the mutual transmission and reception of data or programs and of signals for controlling each other. The CPU 20 exercises control over various controls: for transmitting various kinds of data accumulated in the RAM 24 and various programs such as JAVA applet and the like from the antenna 26 to the secondary terminal 3; for writing the data transmitted from the secondary terminal 3 through the antenna 26, on the RAM 24, on a DVD recording medium loaded in the DVD driver 2E, or on a memory card loaded in the card interface 2H; for mutual remote control between the CPU 20 and the secondary terminal 3 via the antenna 26 executed under various programs installed in the secondary terminal 3; and the like.

The CPU 20 further exercises control over operational controls for various functions installed in the primary terminal 2, for example, the launching of an application program stored in the RAM 24, a DVD recording medium loaded in the DVD driver 2E or a memory card loaded in the card interface 2H on the basis of an actuating signal inputted through the manipulation of the operation keys 2B; the displaying of a video or an image on the display panel 2A on the basis of the data stored in those recording mediums; the outputting of audio to the speaker 2F or a headphone connected to the headphone terminal 2G; and the executing of an application program for navigation recorded in the navigation ROM 25; and the like.

The CPU 20 also exercises control over a systematic sharing of operation between the primary terminal 2 and the secondary terminal 3, as described later, when the secondary terminal 3 is attached to the primary terminal 2 and the CPU 20 receives from the combination detection sensor pairs 2D a detection signal representing the attachment of the secondary terminal 3.

Figure 7:
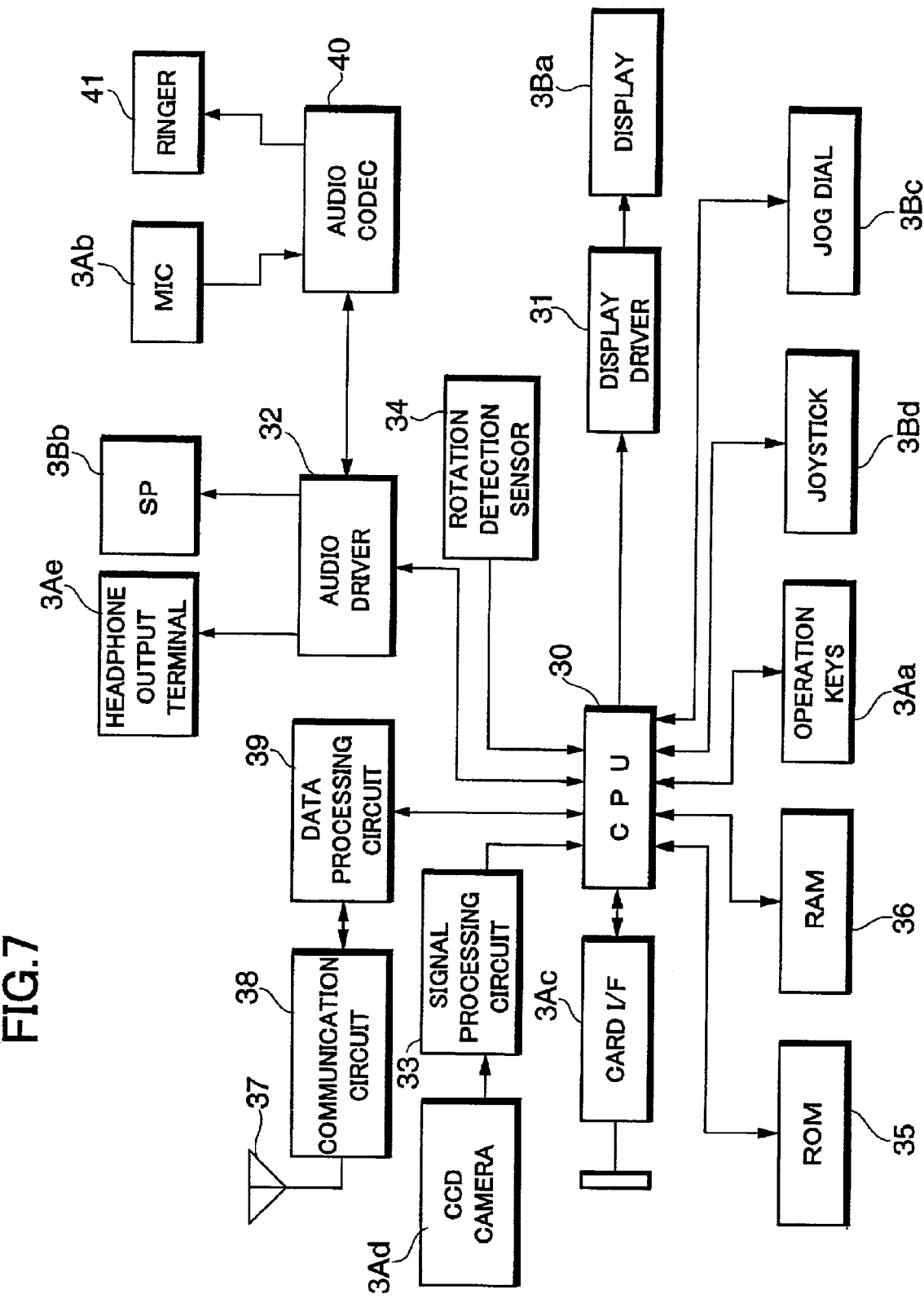
FIG. 7 is a block diagram illustrating the circuit configuration of the secondary terminal in accordance with the embodiment.

FIG. 7 is a block diagram illustrating an example of the configuration of a control section incorporated in the secondary terminal 3 of the portable information terminal 1.

Referring to FIG. 7, a CPU 30 is connected through a display driver 31 to the display panel 3Ba, and through an audio driver 32 to the speaker 3Bb and the headphone terminal 3Ae, and also through a signal processing circuit 33 to the CCD camera 3Ad. The CPU 30 is further connected to a rotational position detection sensor 34 of the display part 3B; a card interface 3Ac for loading a memory card such as a SmartMedia, compact flash, memory stick, and multimedia card; a ROM 35 for storing driver software programs for driving the devices connected to the CPU 30, and the like; a RAM 36 for storing application programs and data; the operation keys 3Aa; the joystick 3Bd; and the jog dial 3Bc.

The CPU 30 is further connected to an antenna 37, incorporated inside the casing of the secondary terminal 3, through a data processing circuit 39 and a communication circuit 38. The data processing circuit 39 acts as a clock control for various signals transmitted from and received by the communication circuit 38 and serves as an interface of the CPU.

The audio driver 32 is connected through an audio code 40 to the microphone 3Ab and a ringer 41.

In the control section of the secondary terminal 3 of the portable information terminal 1, the antenna 37 provides for communication, based on Bluetooth technology or the like, between the primary terminal 2 and the secondary terminal 3 for the mutual transmission and reception of data or programs and of signals for controlling each other, and also provides for connection to computer networks such as the Internet or the like. The CPU 30 exercises control over a variety of controls: for transmitting various kinds of data and various programs such as JAVA applet and the like accumulated in the RAM 36, from the antenna 37 to the primary terminal 2; for writing the data or programs transmitted from the primary terminal 2 through the antenna 37 on the RAM 36 or on a memory card loaded in the card interface 3Ac; for mutual remote control between the CPU 30 and the primary terminal 2 via the antenna 37 executed under various programs installed in the secondary terminal 3; for connecting to the computer networks; and the like.

The CPU 30 further exercises control over operational controls for various functions installed in the secondary terminal 3, for example, execution of an application program stored in the RAM 36 or in a memory card loaded in the card interface 3Ac on the basis of an actuating signal inputted through the manipulation of the operation keys 3Aa, jog dial 3Bc or joystick 3Bd; the displaying of a video or an image on the display panel 3Ba on the basis of the data stored on those recording mediums; outputting of audio to the speaker 3Bb or headphones connected to the headphone terminal 3Ae; the inputting of audio from the microphone 3Ab through an audio code 40 and the audio driver 32; the outputting of audio to the ringer 41 through the audio driver 32 and the audio code 40; the photographing of the CCD camera 3Ad; and the storing of data of the image photographed by the CCD camera 3Ad in the RAM 36 or a memory card loaded in the card interface 3Ac.

The CPU 30 also controls the switching to operational mode corresponding to each position of the display part 3B as described later, on the basis of a detection signal representing a rotational position of the display part 3B of the secondary terminal 3 in relation to the secondary manipulation part 3A which is detected by the rotational position detection sensor 34.

Next, the operation of the aforementioned portable information terminal 1 will be described for each usage pattern of the primary terminal 2 and the secondary terminal 3.

Functions installed in the primary terminal 2 are based on the application programs stored in the ROM 23, RAM 24 and navigation ROM 25, and the application programs stored on a DVD recording medium loaded in the DVD driver 2E or a memory card loaded in the card interface 2H. The user therefore can customize the configuration of functions installed in the portable information terminal 1 to make the functional configuration desirable by rewriting the application program in the RAM 24 or changing the DVD recording mediums or the memory cards.

Likewise, functions installed in the secondary terminal 3 are based on the application programs stored in the ROM 35 and RAM 36, and the application programs stored on a memory card loaded in the card interface 3Ac. The user can customize the configuration of functions installed in the portable information terminal 1 to make the functional configuration desirable by rewriting the application program in the RAM 36 or changing the memory cards.

First, with reference to FIG. 1 and FIG. 8, a description will be given for usage patterns in combination mode in which the secondary terminal 3 is placed on the mounting base 2C of the primary terminal 2 for combination with the primary terminal 2.

FIG. 1 illustrates the usage pattern when the display part 3B of the secondary terminal 3 combined with the primary terminal 2 is in the closed position (i.e. the display part 3B and the secondary manipulation part 3A are superimposed on each other).

Figure 8:
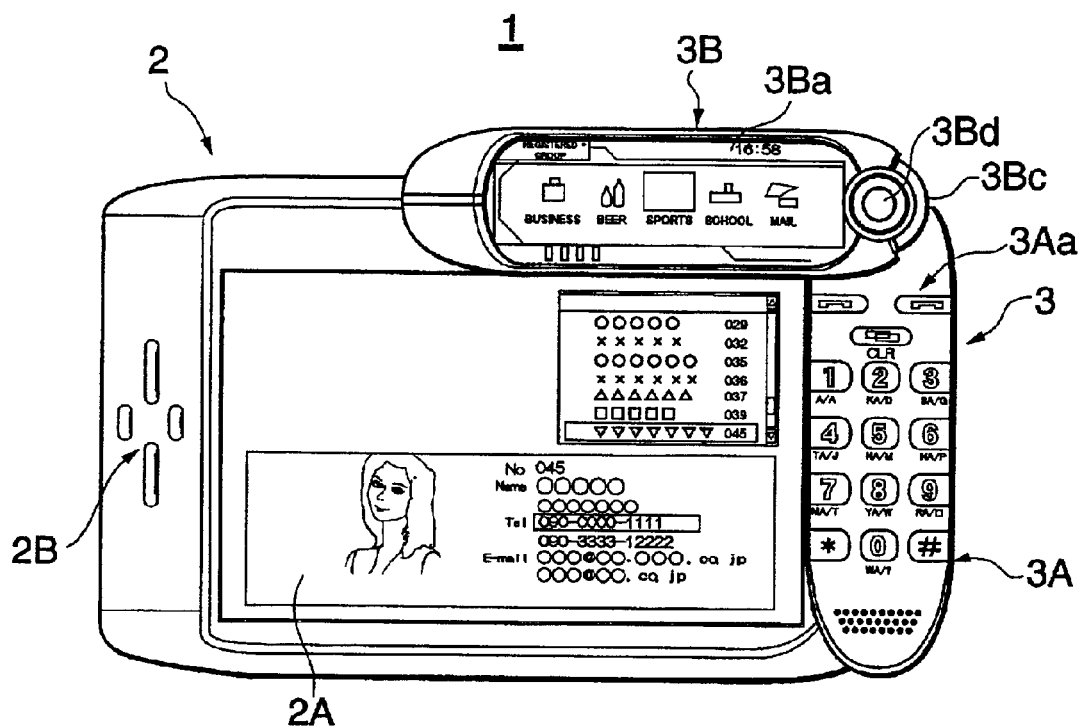
FIG. 8 is a front view illustrating an example of usage patterns of the portable information terminal in combination mode in accordance with the embodiment.

FIG. 8 illustrates the usage pattern when the display part 3B of the secondary terminal 3 is in the first open position in relation to the secondary manipulation part 3A (i.e. the display part 3B is moved to form a right angle with the secondary manipulation part 3A), and is set in parallel to the top edge of the display 2A.

In the above usage pattern in combination, the combination detection sensor pairs 2D mounted on the mounting base 2C detects that the secondary terminal 3 is fitted into the mounting base 2C, and then sends a resulting combination detection signal representing the combination of the secondary terminal 3 with the CPU 20, and thus the primary terminal 2 recognizes the combination of the secondary terminal 3.

The combination between the primary terminal 2 and the secondary terminal 3 is secured by means of an engagement of an engaging element, provided in the mounting base 2C, with the secondary terminal 3 or of magnetic attraction between the secondary terminal 3 and the mounting base 2C.

Upon the detection of the combination with the secondary terminal 3, the CPU 20 switches to combination mode, and a Bluetooth communication is established between the antenna 26 of the primary terminal 2 and the antenna 37 of the secondary terminal 3 to conduct remote control between the CPU 20 and the CPU 30 of the secondary terminal 3, thereby enabling the user to operate the secondary terminal 3 from the operation keys 2B of the primary terminal 2, and to operate the primary terminal 2 from the operation keys 3Aa, jog dial 3Bc or joystick 3Bd of the secondary terminal 3.

Thus, it is possible for a variety of application programs installed in the primary terminal 2 and secondary terminal 3 to implement the so-called "multi-play" capabilities established by means of the systematic link between the displays and operation sections, such as the operation keys, of both primary and secondary terminals 2 and 3, resulting in allowing the portable information terminal 1 to fully function as a mobile computer.

With the "multi-play" capability, the portable information terminal 1 can execute a variety of operations, for example: the terminal 1 is connected to the Internet by using a connecting function of the secondary terminal 3 and displays the Web page on the larger-size display panel 2A of the primary terminal 2; and the terminal 1 displays data of addresses registered in the secondary terminal 3 or data of an image photographed by the CCD camera 3Ad of the terminal 3, on the display 2A of the primary terminal 2 for editing; or the like.

In combination mode when the primary terminal 2 and secondary terminal 3 are combined, the display 2A and the display 3Ba form a double window. Through the use of the double window, for example, the display 3Ba of the secondary terminal 3 having a screen smaller in area than that of the display 2A of the primary terminal 2 can be used as an auxiliary window such as a display window for displaying a list of folders in the upper hierarchy, as a character window for displaying a character set to allow the user to choose a symbol or the like required for creating the document on the display 2A, a guide window for displaying a key guide and the like, and the like. Thus, with the double window, the display space of the display 2A of the primary terminal 2 is smaller than that of the display of a notebook-type personal computer, but can be effectively used, leading to the creation of a smooth and mobile computing.

FIG. 8 illustrates another example of the usage patterns of the portable information terminal 1 serving as mobile computing due to the double window. When the display part 3B of the secondary terminal 3 is in the first open position in relation to the secondary manipulation part 3A (i.e. the display part 3B is opened to form a right angle with the secondary manipulation part 3A) and the display 3Ba is laid over and in parallel to the top edge of the display 2A, the portable information terminal 1 can display icons indicating kinds of databases or a variety of toolbars on the display 3Ba, to provide an operational screen equivalent to that of a general personal computer.

In this first open position, the operation keys 3Aa arranged on the secondary manipulation part 3A of the secondary terminal 3 are on view and available for use. Hence, the secondary manipulation part 3A is used as a keyboard and the operation keys 2B of the primary terminal 2 are used as cursor keys, and also the jog dial 3Bc and the joystick 3Bd of the secondary terminal is used on behalf of a mouse, thereby allowing the portable information computer 1 to serve as a mobile computer in a usage pattern similar to that of a notebook-type personal computer.

As described above, when the display part 3B of the secondary terminal 3 is opened or closed in relation to the secondary manipulation part 3A to change the usage patterns of the portable information terminal 1, the rotational position detection sensor 34 (see FIG. 7) detects the position of the display part 3B of the secondary terminal 3 in relation to the secondary manipulation part 3A, and applies a detected rotational position detection signal to the CPU 30. Then, the CPU 30 transmits the detected signal to the CPU 20 of the primary terminal 2 by way of the Bluetooth communication, and then the primary terminal 2 and the secondary terminal 3 are automatically switched into the mode corresponding to the usage pattern in each rotational position.

Next, a description will be given of a usage pattern when the combined primary terminal 2 and secondary terminal 3 are separated to be used individually.

FIG. 2 illustrates an example of usage patterns when the primary terminal 2 is used alone.

The primary terminal 2 serves as a DVD player when a DVD software is mounted on the DVD drive 2E provided on the back of the primary terminal 2 (see FIG. 3). In this case, the operation keys 2B are respectively allocated the functions of "play", "stop", "fast forward" and "fast backward", for example.

The primary terminal 2 can be used in various patterns, for example, as a television receiver when a memory card having a TV receiving capability is loaded in the card interface 2H, and as an image display if a certain memory card having a required capability is loaded.

Each of FIGS. 4, 9, 10, 11A and 11B illustrates an example of usage patterns when the secondary terminal 3 is used alone.

FIG. 4 illustrates a usage pattern when the display part 3B of the secondary terminal 3 is in the second open position in relation to the secondary manipulation part 3A (i.e. the display part 3B is opened 180 degrees from the secondary manipulation part 3A).

In the second open position, the secondary terminal 3 has the maximum distance between the microphone 3Ab incorporated in the bottom end of the secondary manipulation part 3A and the speaker 3Bb incorporated in the top end of the display part 3B, and the operation keys 3Aa of the secondary manipulation part 3A are on view and available for use. Accordingly, the second open position allows the secondary terminal 3 to be used as a speech communication device such as a portable telephone or the like.

Figure 9:
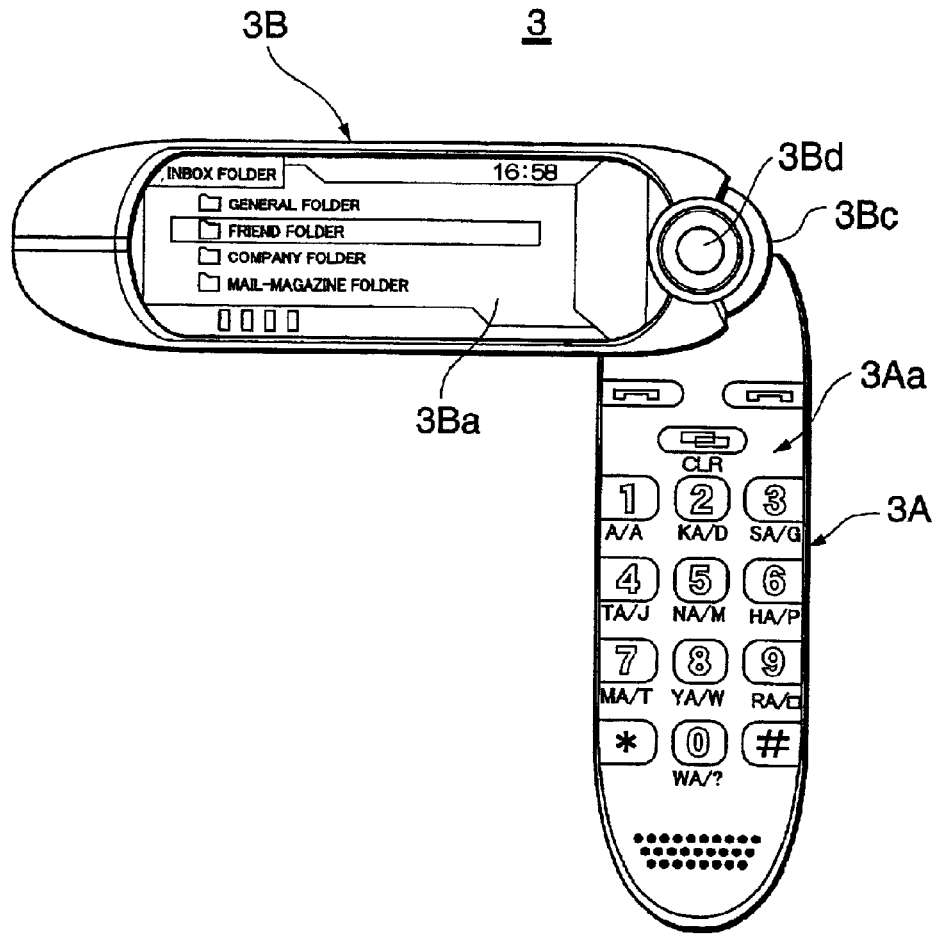
FIG. 9 is a front view illustrating an example of usage patterns of the secondary terminal according to the embodiment.

FIG. 9 illustrates an example of the usage patterns when the display part 3B of the secondary terminal 3 is in the first open position in relation to the secondary manipulation part 3A (i.e. the display part 3B is opened to form a right angle with the secondary manipulation part 3A).

In this first open position, the secondary terminal 3 can be used on the basis of the function corresponding to, for example, transmission/receipt mode for an electronic mail in which the built-in communication circuit 37 (see FIG. 7) establishes connection with the Internet; remote-control mode for remotely controlling a domestic appliance or the like through the Bluetooth communication; or credit-payment mode for paying at a convenience store, vending machine, ticket machine or the like.

Figure 10:
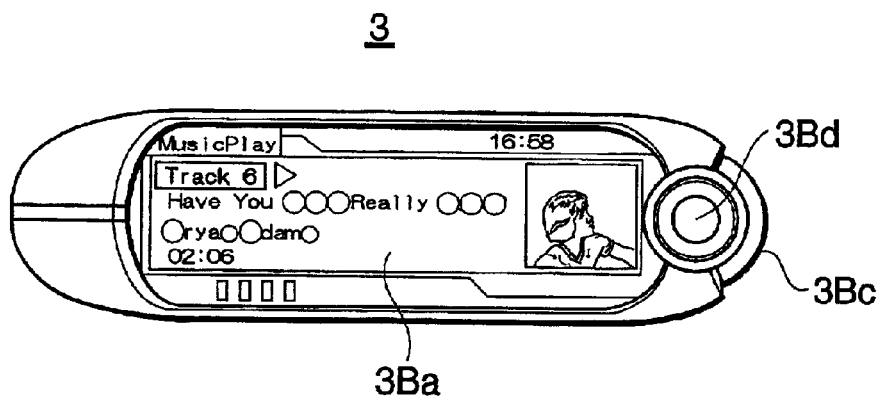
FIG. 10 is a front view illustrating another example of the usage patterns of the secondary terminal according to the embodiment.

FIG. 10 illustrates an example of the usage patterns when the display part 3B of the secondary terminal 3 is in the closed position relative to the secondary manipulation part 3A (i.e. the display part 3B and the secondary manipulation part 3A are superimposed on each other).

In the usage pattern in the closed position, the secondary terminal 3 is used as a music player as shown in FIG. 10 by way of example. If the user connects headphones to the headphone terminal 3Ae, he/she can enjoy listening to music on the basis of MPEG4 or the like.

Figure 11:
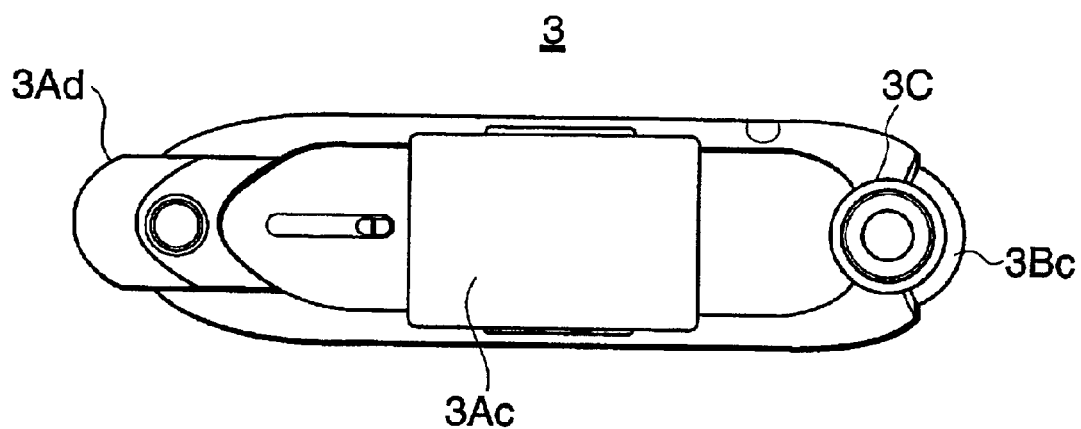
FIG. 11A is a rear view illustrating a usage pattern of the secondary terminal with a CCD camera according to the embodiment.
FIG. 11B is a front view of the usage pattern in FIG. 11A.
Figure 11:
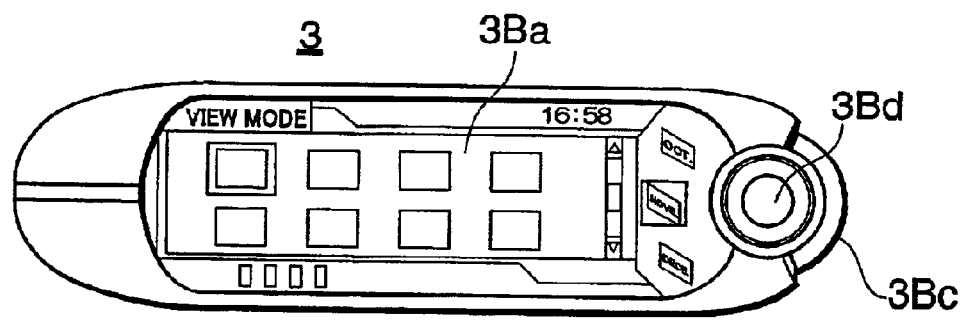

FIGS. 11A and 11B illustrate another example of the usage patterns when the display part 3B of the secondary terminal 3 is in the closed position relative to the secondary manipulation part 3A.

As illustrated in FIG. 11A, the secondary terminal 3 in the usage pattern can is used as a digital camera when the CCD camera 3Ad mounted on the back of the secondary terminal 3 is slid out from the casing to set a lens in a correct position for exposure.

In this use, the CPU 30 determines from a detection signal sent from a sensor (not shown) that the CCD camera 3Ad has been slid out from the casing, and automatically switches into camera mode.

As shown in FIG. 11B, then, thumbnail images of the images photographed by the CCD camera 3Ad are displayed on the display 3Ba of the display part 3B to allow the user to check the photographed images.

In the aforementioned usage patterns of the secondary terminal 3 separated from the primary terminal 2, various operating methods can be implemented, in which, for example, the secondary terminal 3 reads and activates the application programs stored in the RAM 36 (see FIG. 7) to perform a variety of functions, and various kinds of data subject to manipulation on the secondary terminal 3 are retained in the RAM 24 of the primary terminal 2 and only the data required for manipulation on the secondary terminal 3 is copied from the RAM 24 into the RAM 36 of the secondary terminal 3 as occasion requires.

The secondary terminal 3 can transmit a program or data downloaded through the Internet or the like, image data of photographs taken by the CCD camera 3Ad and required to be stored, or the like, to the primary terminal 2 for storing as appropriate.

Such various operating methods achieve the effective use for programs and data of a storage region of the RAM 36 of the secondary terminal 3 which has a storage capacity smaller than that of the primary terminal 2, and allow distributed storage of data in the primary terminal 2 and the secondary terminal 3. Thus, the present invention can overcomes the security problems associated with the carrying of various kinds of data.

The transmission and receipt of the application programs and various kinds of data between the primary terminal 2 and the secondary terminal 3 as described above, are performed through the Bluetooth communication between the primary and secondary terminals either when the primary terminal 2 and secondary terminal 3 are combined together or when they are separated from each other.

Figure 12:
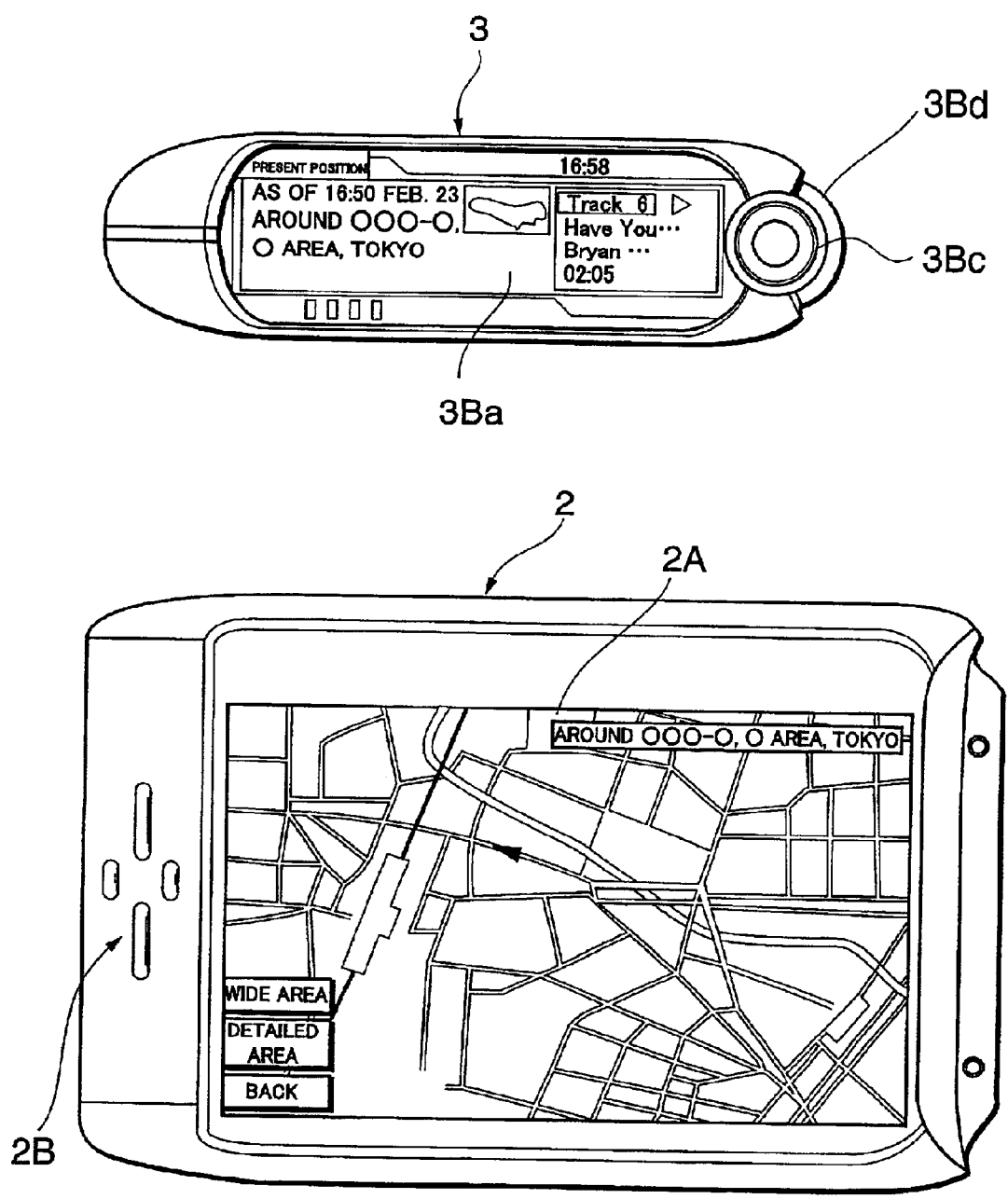
FIG. 12 is a front view illustrating an example of usage patterns of the portable information terminal as a navigation system according to the embodiment.

FIG. 12 illustrates an example of usage patterns when the portable information terminal 1 serves as a handy navigation system by means of the systematic link between the primary terminal 2 and the secondary terminal 3.

The usage pattern in FIG. 12 can be performed either when the primary terminal 2 and secondary terminal 3 are combined together or when they are separated from each other as shown in FIG. 12.

Specifically, in the primary terminal 2, a DVD recording map images is loaded in the DVD drive 2E, and the navigation application program stored in the navigation ROM 25 is activated to display the navigation map image on the display 2A.

A present position of the terminal is detected by a communication function provided in the secondary terminal 3. For example, a memory card having a GPS function is loaded in the card interface 3Ac of the secondary terminal 3 and the GPS function is used for detecting the present position.

Figure 13:
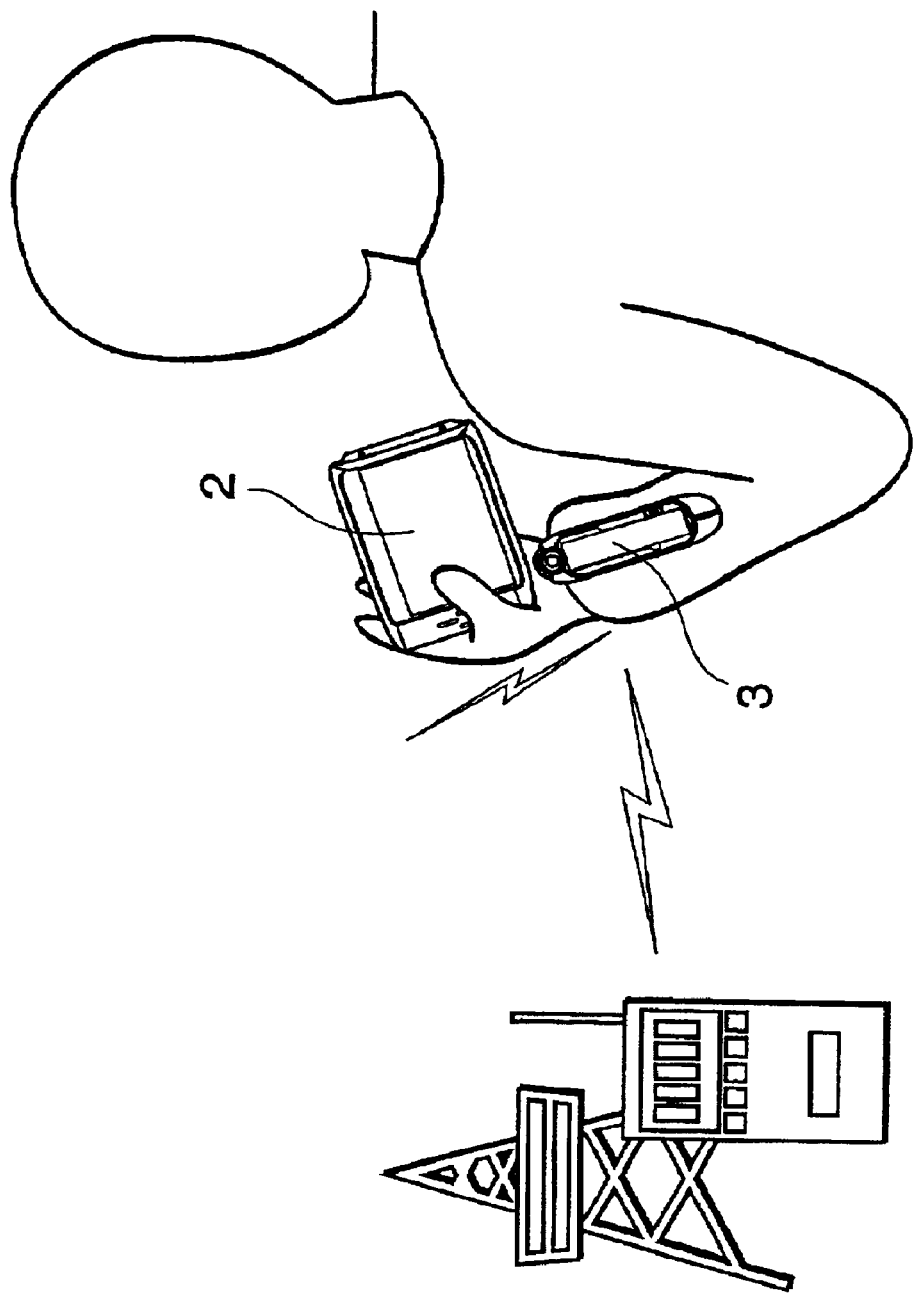
FIG. 13 is a diagram for explaining how to use the portable information terminal as the navigation system relating to FIG. 12.

Alternatively, as illustrated in FIG. 13, the PHS communication function or the Bluetooth communication function incorporated in the secondary terminal 3 establishes communication with PHS (personal handyphone system) relay antennas or communication with sales-managing communication antennas attached to vending machines or the like, to detect the present position, and the positional information detected by either the PHS or the Bluetooth communication function is transmitted to the primary terminal 2 by way of the Bluetooth communication. The primary terminal 2 displays a mark indicating the present position on the map data image displayed on the display 2A for guidance to the destination.

The terms and description used herein are set forth by way of illustration only and are not meant as limitations. Those skilled in the art will recognize that numerous variations are possible within the spirit and scope of the invention as defined in the following claims.

What is claimed is:

1. A portable information terminal comprising:
   a primary terminal including a display, a manipulation element, a memory section for storing application programs, a communication element, and a control section for controlling the display, the manipulation element, the memory section and the communication element, and performing a control operation under an activated application program of the application programs stored in the memory section to operate a required function and allow the display to display an image in accordance with manipulation of the manipulation element; and
   a secondary terminal separably combined with said primary terminal, and including a display, a manipulation element, a memory section for storing application programs, a communication element, and a control section for controlling the display, the manipulation element, the memory section and the communication element, and performing a control operation under an activated application program of the application programs stored in the memory section to operate a required function and allows said display to display an image in accordance with manipulation of the manipulation element,
   wherein through communication between said communication elements of said primary terminal and said secondary terminal, said control sections of the primary and secondary terminals are connected to each other for a systematic link between said respective manipulation elements in terms of manipulation, to perform a linked operation for a required function and allow said respective displays to display mutually associated images in accordance with the manipulation of the respective manipulation elements under an application program of the application programs stored in one or both of the memory sections of the primary and secondary terminals.

2. A portable information terminal according to claim 1, wherein said primary terminal further includes a secondary-terminal mounting base for attaching said secondary terminal for combination, and a combination detection member provided, in the secondary-terminal mounting base, for detecting attachment of said secondary terminal and then connecting said control section of the primary terminal to said control section of the secondary terminal.

3. A portable information terminal according to claim 1, wherein said primary terminal further includes an interface for mounting an external storage medium.

4. A portable information terminal according to claim 3, wherein said interface is a DVD drive.

5. A portable information terminal according to claim 3, wherein said interface of said primary terminal is a memory-card interface.

6. A portable information terminal according to claim 1, wherein said display of said primary terminal has a display screen area larger than that of said display of said secondary terminal.

7. A portable information terminal according to claim 1, wherein said communication element of said primary terminal performs Bluetooth communication to communicate with said communication element of said secondary terminal.

8. A portable information terminal according to claim 1, wherein said secondary terminal further includes an interface for mounting an external storage medium.

9. A portable information terminal according to claim 8, wherein said interface of said secondary terminal is a memory-card interface.

10. A portable information terminal according to claim 1, wherein said secondary terminal further includes a digital photographing member.

11. A portable information terminal claim 1, wherein said manipulation element of the secondary terminal includes a key-button member, a jog dial member and a joystick member.

12. A portable information terminal according to claim 1, wherein said display of said secondary terminal is fitted movably in relation to a portion of the secondary terminal attached to said primary terminal, to be set in a position selected from a plurality of selectable positional patterns with respect to said display of the primary terminal when said secondary terminal is combined with said primary terminal.

13. A portable information terminal according to claim 12, wherein said secondary terminal further includes a positional detection member for detecting the positions of said display of the secondary terminal, and said control section of the secondary terminal is switched into a predetermined functional mode corresponding to the position of the display detected by the positional detection member.

14. A portable information terminal according to claim 1, wherein said communication element of said secondary terminal performs Bluetooth communication with said communication element of said primary terminal, and communication with a mobile communication network.

15. A portable information terminal according to claim 1, wherein said secondary terminal includes a microphone and a speaker, and is installed with an application program for performing a telephone function for communication with a mobile communication network through said communication element of the secondary terminal.

* * * * *